Feb. 17, 1953   K. P. BILLNER   2,628,402
METHOD AND APPARATUS FOR MOLDING CONCRETE
Filed Feb. 20, 1948   2 SHEETS—SHEET 1
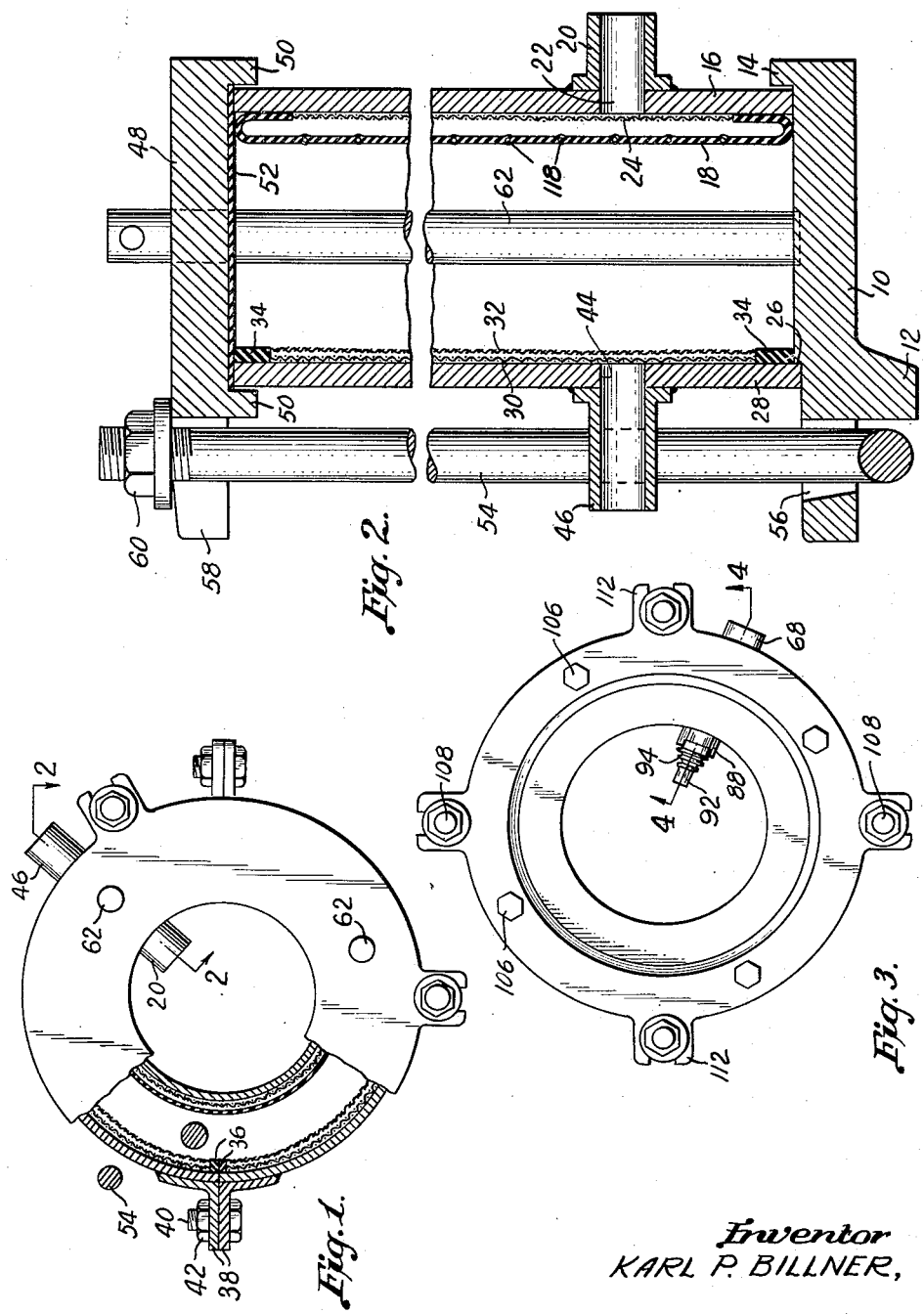
Inventor
KARL P. BILLNER,
By Raymond W Colton
Attorney Feb. 17, 1953  K. P. BILLNER  2,628,402
METHOD AND APPARATUS FOR MOLDING CONCRETE
Filed Feb. 20, 1948  2 SHEETS—SHEET 2
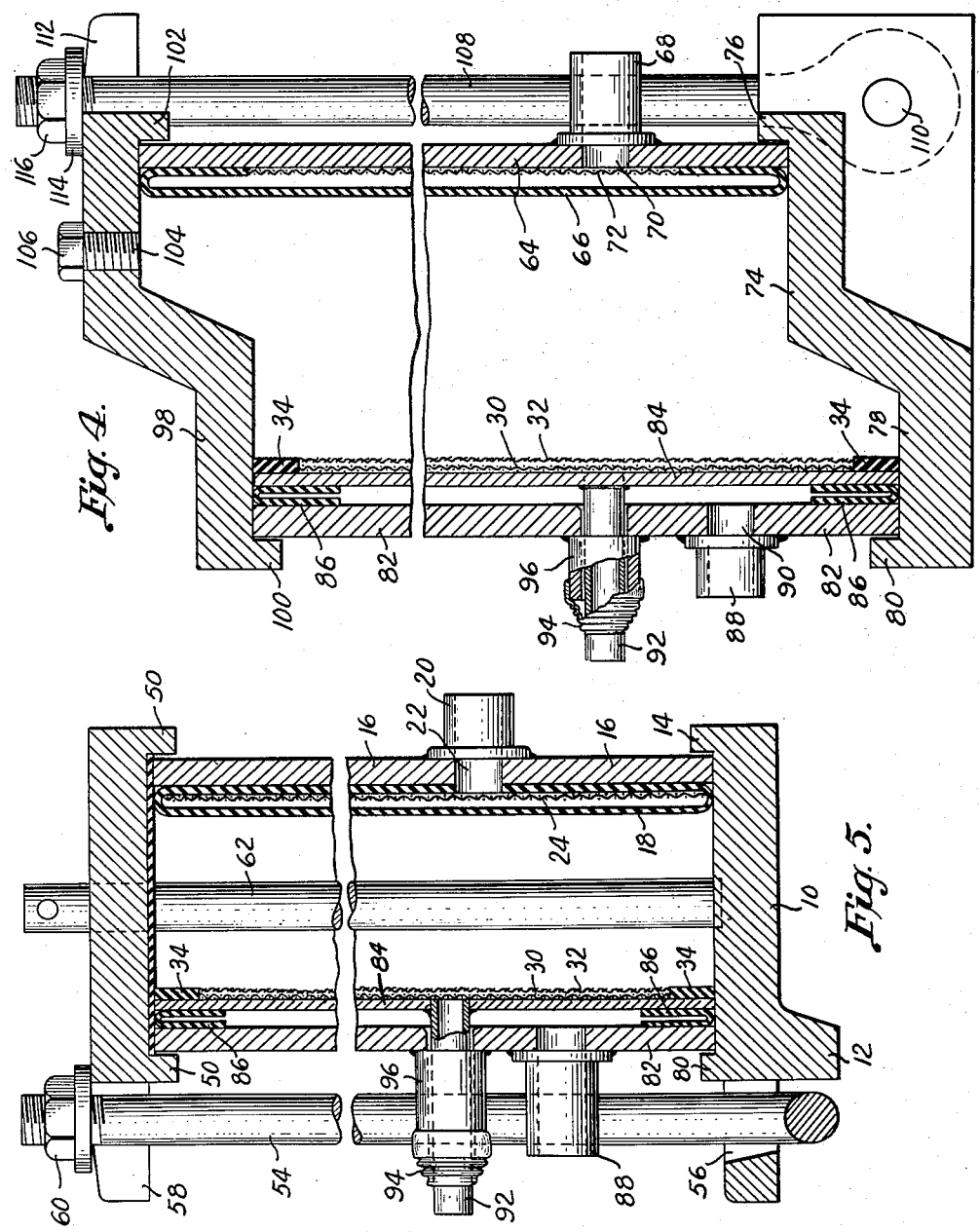
Inventor
KARL P. BILLNER,
By Raymond Wheeler
Attorney Patented Feb. 17, 1953

2,628,402

UNITED STATES PATENT OFFICE 2,628,402

METHOD AND APPARATUS FOR MOLDING CONCRETE

Karl P. Billner, Philadelphia, Pa., assignor to Vacuum Concrete, Inc., a corporation of Pennsylvania Application February 20, 1948, Serial No. 9,679

14 Claims. (Cl. 25—30)

1

This invention relates to apparatus and methods and molding plastic bodies.

Whereas in many of its aspects, the invention is equally suited to the production of columns, posts, beams, pipes, piles and many other products, the examples selected for illustrating the invention, deal with the production of tubular bodies such as pipes and piles. Such bodies can be compacted under high pressures in accordance with the present invention, thus increasing their resistance to the various stresses encountered in use, including those resulting from the high internal pressures experienced in conduits for conveying water or oil, for example. Provision has been made for prestressing the resulting products where desired, although this application is not primarily concerned with prestressing problems.

By virtue of the present invention, it is possible not only to produce bodies which are more highly compacted than have been customarily produced in this art, but the removal of the molded bodies from the forms is greatly simplified, thus promising highly improved products and probably a reduced cost in production.

The molding apparatus may comprise a form having opposed walls for confining a plastic body, fluid actuated means for relatively shifting the walls to change the volume of the form and means for evacuating the form through one of the walls. Although one of these walls may be sectional, it is preferred in most cases that each of the walls be unitary. To assist in the removal of vehicle from the plastic material, such as excess water above that required for setting where the plastic material is concrete, one of the walls may have a fluid pervious surface exposed to the plastic body through which the vehicle can be expressed and/or withdrawn. The opposed walls are preferably provided with closure means to prevent the space between them from communicating with atmosphere. A superambient pressure supply may be provided for the relative shifting of the walls and a subambient pressure supply may be provided for evacuating the form.

The method may comprise depositing a body of plastic material containing a vehicle in a mold, subjecting a surface of the body to superatmospheric pressure to compact the same and express vehicle therefrom and subjecting a surface of the body to subatmospheric pressure to withdraw vehicle therefrom. Under some conditions, the superatmospheric and subatmospheric pressures may be applied simultaneously. In any case, the application of superatmospheric pressure is preferably substantially uniform over the

2 surface of the body. Where a tubular body is to be molded, a tubular cavity will be provided by the mold and the same surface of the body may be subjected to superatmospheric and subatmospheric pressure. In the case of such a tubular body, the opposed peripheral surfaces may be subjected to superatmospheric pressure and one of these surfaces subjected to subatmospheric pressure.

When the body thus molded has become sufficiently self supporting, subatmospheric pressure may be substituted for the superatmospheric pressure to separate the mold from the body and thereby facilitate removal of the body from the mold.

To assure uniform products, the outlet for excess vehicle may be closed during the initial application of a superatmospheric pressure lower than that ultimately employed, thus distributing the pressure throughout the plastic composition while it is most fluid, and before any of the excess vehicle has been removed.

The molding apparatus for plastic bodies according to this invention may comprise a relatively rigid bearing wall, a relatively deformable plastic confining member defining a fluid chamber adjacent the wall, and port forming means communicating with the chamber for varying the pressure therein. Where the relatively rigid bearing wall is arcuate, the confining member is preferably substantially parallel thereto, and where the wall is annular, the confining member is substantially concentric with respect thereto. Where the wall is tubular, the confining member may be adjacent its inner surface or its outer surface, and where the wall and member jointly define the chamber, they will be in fluid sealing relationship, one with the other. For some applications, the confining member will be composed of flexible resilient material such as natural or synthetic rubber containing compositions, while in other cases, the confining member will be relatively inflexible and assume the form of a metal tube which can be stressed under pressure so as not to exceed its elastic limit or yield point, whereby it will impart to the adjacent surface of the plastic material an exceedingly regular surface, which is preferably the internal surface in the case of a pipe, and the external surface in the case of a pile, for example. In some instances, it is desirable to provide a spacer between the relatively rigid wall and the relatively deformable confining member to assure uniform distribution of the fluid under pressure introduced therebetween, and such a spacer may assume the form of a woven mesh or the like. The confining member may carry a fluid pervious material for contact with the plastic body, and port forming means may be provided in communication therewith for removal of vehicle from the plastic body by one or more of the effects contemplated.

A more complete understanding of the invention will follow from a description of the attached drawings wherein:

Fig. 1 is a plan view, partially broken away, of one form of molding apparatus;

Fig. 2 is a section taken along line 2—2 of Fig. 1;

Fig. 3 is a plan view of another form of molding apparatus;

Fig. 4 is a section taken along line 4—4 of Fig. 3; and

Fig. 5 is a fragmentary sectional elevation of a modification incorporating features of the other forms.

The apparatus depicted in Figs. 1 and 2 may be employed in the molding of tubular bodies for various uses, composed of various plastic materials, but it will be described for the production of concrete piles. The apparatus is supported by an annular base 10 having an outer downturned flange 12 for engagement with a supporting surface and an inner upturned flange 14 serving to locate an inner annular relatively rigid bearig wall 16 to the outer periphery of which is secured by suitable adhesive or the like, a relatively deformable plastic confining member 18, represented as being of rubber-like material. Except for the upper and lower edges of the confining member 18 which are secured to the outer surface of the bearing wall 16, the confining member will move radially outwardly upon the introduction of superatmospheric pressure into the chamber formed between it and the wall, through a nipple 20 welded to the wall and registering with a port 22 penetrating the wall. In the interests of achieving uniform pressure distribution in the chamber, a spacer 24, of woven wire or other suitable material, will be interposed between the member and the wall.

Towards the outer portion of the base 10, its upper surface is stepped to form a limiting shoulder 26 for the outer substantially rigid wall 28, to the inner surface of which is applied a woven wire mesh 30 surfaced with a woven textile material 32 providing a fluid pervious surface for contact with the plastic material in order that excess water or other vehicle can be removed during the compacting operation. The upper and lower edges of this porous surface terminate in sealing gaskets 34 with a view towards maintaining desired pressures without appreciable leakage, and the longitudinal edges are provided with similar sealing members 36 where the outer wall is sectional as depicted in Fig. 1 wherein the two separable sections are provided with flanges 38 secured together by means of bolts 40 and nuts 42. The outer wall 28 is likewise provided with a port 44 in registry with a nipple 46 which may be welded or otherwise suitably secured thereto, to form a passage through which excess vehicle removed from the plastic composition can be drained. A closure 48 of annular form provided with downturned flanges 50 for overhanging the upper edges of the walls 16 and 28 is provided with a sealing gasket 52 to assist in maintaining desired pressure within the mold. The closure with its gasket can be secured to the base in fluid tight relationship, by the use of bolts 54, the lower ends of which are pivotally received through openings 56 provided by the base and the upper ends of which are received by the bifurcated lugs 58, whereupon the nuts 60 can be advanced on their threads. A suitable number of cores 62 can be employed where desired, and removed when the composition has become self-supporting to provide passages for the reception of reinforcing material for subsequent prestressing, for example.

In the modification depicted in Figs. 3 and 4, the mold assumes a form eminently suited to the production of pipe sections of the bell and spigot type. In this case, the wall 64, deformable member 66, nipple 68, port 70 and spacer 72 substantially correspond with the elements 16, 18, 20, 22 and 24 respectively of Fig. 2. The base 74 in this case provides an outer upturned flange 76 to locate and retain the wall 64, the base providing a step 78 radially inwardly from its flange 76 to provide another upturned flange 80 to locate and retain an inner relatively rigid bearing wall 82. Immediately surrounding the rigid wall 82, there is provided a stiff, though somewhat deformable annular member 84 which will cause its pervious surface, defined by the woven mesh 30 and textile material 32 to impart a highly regular surface to the adjacent plastic body during the compacting operation. Here again, sealing gaskets 34 are provided at the upper and lower edges, but in this case, there are no longitudinal gaskets since the wall 82 is in this case unitary. Seals are formed between the relatively rigid wall 82 and the relatively deformable wall 84 by means of the U-shaped members 86 whose legs may be suitably adhesively secured to the walls. Fluid under pressure can be introduced into the chamber between these walls through a nipple 88 in communication with a port 90. Subatmospheric pressure can be applied at the pervious surface of the deformable wall 84 through a nipple 92, suitably welded thereto, for which a fluid seal is provided by a flexible bellows or diaphragm 94 secured thereto and to a bearing sleeve 96 through which the nipple passes.

A closure 98 provides downturned flanges 100 and 102 for locating and retaining the walls 84 and 82, and this closure is stepped in a manner conforming to the base so as to produce an upper end on the molded body substantially complementing its lower end. The closure is provided with a threaded opening 104 through which grout can be introduced to fill the mold, and into which a threaded plug 106 will be received prior to the application of any appreciable superatmospheric pressure. The closure will be secured to the base by means of eye-bolts 108 provided with pivots 110 at the base and having their upper ends received by the bifurcated lugs 112 upon which their washers 114 bear upon tightening their nuts 116.

The modification depicted in Fig. 5 incorporates features of the preceding forms in a somewhat different combination, and exemplifies the invention as it may be used in the production of a tubular pile. In this case the base 10 is provided with a downturned flange 12 for engagement with a support and an inner upturned flange 14 for locating and retaining the inner rigid wall 16 having a deformable member 18, nipple 20, port 22 and spacer 24, in somewhat the arrangement described with respect to Fig. 2. In this case, however, the deformable member 18 is somewhat toroidal in shape, as compared with the short reversely turned edges provided in the construction of Fig. 2. Thus, the spacer 24 of Fig. 5 will be confined within the envelope defined by the deformable member 18.

The outer wall 82 substantially duplicates the construction and associated parts described in connection with the correspondingly identified inner wall of Fig. 4. Accordingly, the parts of this figure have been identified to conform with their corresponding parts in the other figures.

It will be noted that in Fig. 5, the outer wall 82 is unitary as distinguished from the sectional wall depicted in Fig. 1.

When a body is to be molded with the apparatus of Figs. 1 and 2, the closure 48 will be removed and the cavity defined by the base 10 and walls 16 and 28 will be filled with a plastic composition such as concrete, which will be vibrated until the mold is uniformly full, the closure will be applied and secured in place and superatmospheric pressure will be applied at the nipple 20 causing the deformable wall 18 to move radially outwardly, uniformly over its entire surface to compact the plastic material while simultaneously expressing excess vehicle from the plastic body through the pervious surface provided by the outer peripheral wall 28. Simultaneously, subatmospheric pressure can be applied at the nipple 46 to withdraw excess vehicle, but if desired, these pressures may be applied singly or sequentially.

By thus removing excess vehicle, the plastic body will become self sustaining relatively quickly, whereupon the pressures may be discontinued and if desired, subatmospheric pressure may be applied at the nipple 20 to assist in separating the deformable wall 18 from the plastic body. The sectional outer wall and closure, Figs. 1 and 2, can then be dismantled and the plastic body removed for curing.

The operation in connection with Figs. 3 and 4 will be quite similar except that in this case, subatmospheric pressure for compacting and removing excess vehicle will be applied at the internal and external peripheries through the nipples 88 and 68 respectively, the pressure applied to the nipple 88 preferably somewhat exceeding that applied at the external wall to assure a highly regular surface internally of the pipe. As previously indicated, simultaneously with, subsequent to or prior to the application of the superatmospheric pressure, subatmospheric pressure can be applied at the nipple 92 to withdraw excess vehicle at the pervious surface defined on the stiff through deformable wall 84.

It will also be noted in connection with these figures that due to the stepped configuration of the closure, it will preferably be applied with its filling port 104 open, then the form can be filled with grout and the plug introduced to assure both a convenient and satisfactory filling of the form.

The modification shown in Fig. 5 will partake of the same general method as has been described with reference to Figs. 3 and 4, in this case it being the outer wall which must be as regular as possible and this modification contemplates the use of cores 62 of the type described with reference to Fig. 2.

Where the relatively deformable wall is of a flexible nature, such as would be provided by a rubber composition, it may be reinforced in various ways such as by the incorporation of a helically wound wire rope 118 as has been depicted in Fig. 2.

The pervious surfacing materials can be applied to their supports in a variety of ways, such as adhesively, tack welding, or otherwise. The materials comprising the several layers can be preassembled by stitching to a suitable backing, if desired, for ready application to the wall or member involved.

With an internal deformable shell or member 84 as depicted in Fig. 4, the application of superatmospheric pressure through the nipple 88 will first overcome the compression in the fresh concrete and then stretch the thin shell so as to obtain a certain predetermined elongation which will not, however, exceed the elastic limit or yield point of the steel, aluminum, or other material composing it. The increase of radius of such a shell for the production of concrete pipe would in practice be expected to be of the order of a fraction of an inch, say from $1/64''$ to $1/8''$. With an external deformable shell or member 84 as depicted in Fig. 5, apart from the fact that the member will be compressed upon the application of superatmospheric pressure through the nipple 88, the general compacting effects are the same. In this case as well, the materials and pressures will be selected so as to be compatible.

The pressure media may be of any desired type, liquid or gaseous, but the non-explosive properties of liquids such as water, recommend them for the application of the superatmospheric pressures from suitable pumping apparatus. The subatmospheric pressures will be provided by suitable vacuum pumps. Incidentally, the terms "atmospheric" and "ambient" as applied to the pressures employed, have been used interchangeably to signify the pressure at the time and place of operation. For example, submarine pressures though superatmospheric, should be construed as atmospheric or ambient where operation may be carried on beneath the water.

Superatmospheric pressures up to and exceeding 500 pounds per square inch are contemplated herein for certain applications and subatmospheric pressures up to those approaching a perfect vacuum are also intended.

In the interests of maximum uniformity of product, the outlet for excess vehicle may be closed prior to the initial application of the superatmospheric compacting pressures, with the result, that the plastic composition while in its most fluid condition will best fill the form. To avoid the necessity of using closures and securing bolts of excessive weight, it will be desirable to employ such initial superatmospheric pressures for contracting the mold about the plastic body at pressure values below those employed during actual compacting and removal of excess vehicle from the plastic composition. Accordingly, when the mold is uniformly and completely full, the outlet for excess vehicle will be opened and the superatmospheric compacting pressure increased.

Although this invention has been described with reference to but a relatively few illustrations, the many variations and extensions will suggest themselves to those skilled in the art, just as they have been recognized already by the inventor. Accordingly, these examples are not to be construed as restrictive of the invention beyond the scope of the appended claims.

I claim:

1. Apparatus for the production of tubular concrete bodies comprising an inner core member and an outer mold member, one of said members including an annular diaphragm and means to deform the same, the other of said members being capable of withstanding pressure imposed by said means but yieldable to permit limited deformation, a foraminous liner affixed to an inner surface of one of said members for engagement with an interposed body of concrete, and a removable member for sealing said core and outer mold members at one end.

2. Apparatus as set forth in claim 1 wherein said diaphragm is a substantially cylindrical metal shell.

3. Apparatus as set forth in claim 1 wherein said diaphragm is composed of expansible metal and associated with said inner core member.

4. Apparatus as set forth in claim 1 wherein said diaphragm is associated with said outer mold member.

5. Apparatus for the production of tubular concrete bodies comprising an inner core member and an outer mold member, one of said members including an annular diaphragm and means to deform the same, the other of said members being capable of withstanding pressure imposed by said means, said members having opposed surfaces defining an annular cavity, a foraminous liner affixed to one of said surfaces, a removable member for sealing said core and outer mold members at one end providing for the introduction of plastic concrete into said cavity, and means connected with said liner for extracting fluid therethrough.

6. Apparatus as set forth in claim 5 wherein suction means is provided for extracting water through said foraminous liner.

7. Apparatus as set forth in claim 5 wherein fluid means is provided to deform said annular diaphragm.

8. Apparatus as set forth in claim 5 wherein superatmospheric fluid pressure supply means is provided for deforming said annular diaphragm and subatmospheric fluid pressure supply means is provided for extracting water through said foraminous liner.

9. Apparatus as set forth in claim 5 wherein said foraminous liner is affixed to said annular diaphragm.

10. Apparatus as set forth in claim 5 wherein said core and mold members each includes an annular diaphragm and means to deform the same.

11. A method of molding a tubular body comprising depositing a body of plastic material containing excess vehicle in a closed tubular mold cavity, radially contracting said cavity and thereby subjecting said plastic material to superatmospheric pressure to express vehicle therefrom, providing a path for the discharge of expressed vehicle contiguous to a surface of said body, and applying subatmospheric pressure substantially uniformly to said surface of the body simultaneously with the contraction of said cavity.

12. A method as set forth in claim 11 wherein superatmospheric pressure is applied to opposed peripheral surfaces of said body.

13. A method as set forth in claim 11 wherein said cavity is contracted by increasing its internal dimension.

14. A method as set forth in claim 11 wherein said superatmospheric pressure is increased in stages.

KARL P. BILLNER.

REFERENCES CITED

The following references are of record in the file of this patent:

UNITED STATES PATENTS

| Number | Name | Date |
|---|---|---|
| 1,382,326 | Sloper | June 21, 1921 |
| 1,592,536 | O'Neill | July 13, 1926 |
| 1,687,797 | Sachse | Oct. 16, 1928 |
| 1,929,535 | Parker | Oct. 10, 1933 |
| 2,132,002 | Hight | Oct. 4, 1938 |
| 2,233,174 | McDonald | Feb. 25, 1941 |
| 2,253,792 | Leavenworth | Aug. 26, 1941 |
| 2,311,588 | Denning | Feb. 16, 1943 |
| 2,363,107 | Young | Nov. 21, 1944 |
| 2,363,431 | Moorhouse | Nov. 21, 1944 |
| 2,449,407 | Mulholland | Sept. 14, 1948 |